United States Patent [19]

Calafell, II et al.

[11] Patent Number: 4,890,941
[45] Date of Patent: Jan. 2, 1990

[54] BEARING PROTECTOR WITH SLINGER RING

[75] Inventors: Dag O. Calafell, II, Portage; Kenneth G. Kakabaker, Kalamazoo, both of Mich.

[73] Assignee: Durametallic Corporation, Kalamazoo, Mich.

[21] Appl. No.: 338,969

[22] Filed: Apr. 14, 1989

[51] Int. Cl.$^4$ .................. F16C 33/72; F16C 33/80
[52] U.S. Cl. ...................... 384/480; 277/53; 277/56; 277/195; 277/198; 277/199; 384/477; 384/478
[58] Field of Search .............. 384/477, 478, 480; 277/24, 53-56, 59, 74, 79, 194, 195, 198, 199

[56] References Cited

U.S. PATENT DOCUMENTS

| | | | |
|---|---|---|---|
| 868,653 | 10/1907 | Goldsborough . | |
| 1,991,077 | 2/1935 | Brittain, Jr. | 384/480 |
| 2,759,778 | 8/1956 | Anderson | 384/480 |
| 3,893,674 | 7/1975 | Paradine | 277/56 |
| 3,897,072 | 7/1975 | Inka et al. | 277/215 |
| 4,022,479 | 5/1977 | Orlowski | 277/53 |
| 4,114,902 | 9/1978 | Orlowski | 277/53 |
| 4,466,620 | 8/1984 | Orlowski | 277/53 |
| 4,482,194 | 11/1984 | Chambers, Sr. | 384/480 |
| 4,484,754 | 11/1984 | Ballard | 277/53 |
| 4,572,517 | 2/1986 | Rockwood et al. | 277/53 |
| 4,630,458 | 12/1986 | Kakabaker | 384/480 X |
| 4,706,968 | 11/1987 | Orlowski | 277/53 |
| 4,743,034 | 5/1988 | Kakabaker et al. | 277/53 |

Primary Examiner—Thomas R. Hannon
Attorney, Agent, or Firm—Flynn, Thiel, Boutell & Tanis

[57] ABSTRACT

A bearing protector employing a stator and a rotor defining a labyrinth therebetween and disposed for sealing cooperation between a housing and a rotatable shaft. The concentrically fit within one another due to relative axial movement therebetween, each is constructed as an integral continuous one-piece ring. The stator and rotor are axially secured in an assembled condition by a one-piece snap ring carried by the stator and which resiliently distorts to pass axially over the rotor and then resiliently snaps inwardly into a groove in the rotor so as to become fixed to and rotate with the rotor. This snap ring projects outwardly into a radially enlarged annular collecting chamber formed in the stator and acts, when the rotor rotates, as a slinger ring so that contaminates which enter into the labyrinth from the outside come into contact with the slinger ring and are thrown outwardly to the bottom of the collecting chamber for discharge through a drain.

6 Claims, 1 Drawing Sheet

BEARING PROTECTOR WITH SLINGER RING

FIELD OF THE INVENTION

This invention relates to an improved bearing protector for use between a relatively rotatable housing and a shaft to prevent flow of either internal or external contaminates axially along the shaft.

BACKGROUND OF THE INVENTION

Within most industries, it is important that there be provided some type of seal device which prevents fluids from leaking externally from an associated bearing housing or support, and which also prevents contaminates disposed in the environment surrounding the device from working themselves through the seal device into the bearing.

For use in situations of the above type, various types of sealing ring devices have been employed. Such sealing ring devices, sometimes referred to as "bearing isolators", typically employ a pair of relatively rotatable rings (i.e., a rotor and a stator) which are respectively fixed to the rotatable shaft and stationary housing. These relatively rotatable rings have a close fitting relationship to create a complex pathway therebetween, such as a labyrinth, to inhibit flow or movement of fluids or contaminates in either direction therebetween. While such devices have proven at least partially effective in selected use conditions, nevertheless one of the disadvantages of many such devices is the complex configuration of the rings, and the consequent cost of such devices. Also, many of these devices have been unable to prevent flow of fluids or contaminates therethrough to the desired degree. Further, many of these known devices, because of the manner of interfit and cooperation between the stator and rotor, have required that at least some parts be of split construction, thereby further increasing the manufacturing and assembly complexities.

While numerous sealing devices of the above general type have developed, exemplary embodiments of such devices are illustrated by U.S. Pat. Nos. 2,524,124, 4,484,754, 3,897,072, 4,466,620, 4,572,517, 4,114,902, 4,022,479, 3,893,674 and British Specification No. 2 035 472A.

U.S. Pat. No. 4,743,034 as owned by the Assignee of this invention, also relates to a stator and rotor which cooperate to define a labyrinth therebetween so as to effectively restrict flow in either direction therethrough. While the device of this latter patent has proven desirable and effective in some use environments, nevertheless such device also provides less than optimum performance in some use environments, particularly under dynamic conditions.

Accordingly, the present invention relates to an improved sealing device known as a "bearing isolator" or "bearing protector", which device employs a stator ring fixed to the housing and surrounding a rotor ring fixed to the rotatable shaft and cooperating therewith to define a narrow labyrinth or pathway therebetween, which device is of improved design to simplify manufacture and assembly thereof, and which is more effective for preventing flow in either direction through the labyrinth, particularly under dynamic conditions, that is during rotation of the rotor.

In the improved bearing protector of this invention, as aforesaid, the stator and rotor are of a configuration so that one can be readily fit within the other solely due to relative axial movement therebetween, while at the same time each of the stator and rotor can be constructed as an integral continuous one-piece ring. The stator and rotor are axially secured in an assembled condition by a one-piece snap ring which is carried by the stator and resiliently distorts so as to partially pass axially over the rotor and then resiliently snaps inwardly into a groove in the rotor so as to become fixed to and rotate with the rotor. This snap ring projects outwardly into a radially enlarged annular collecting chamber formed within the stator and acts, when the rotor rotates, as a slinger ring so that contaminates which enter into the labyrinth from the outside come into contact with the slinger ring and are thrown outwardly to the bottom of the collecting chamber for discharge through a drain.

Other objects and purposes of the invention will be apparent to persons familiar with devices of this general type upon reading the following specification and inspecting the accompanying drawings.

SUMMARY OF THE INVENTION

In the improved bearing protector of this invention, the stator is nonrotatably and sealingly engaged within an opening formed in the housing, and a rotor snugly surrounds and rotates with the shaft and is sealingly engaged therewith. The stator effectively surrounds the rotor in close fitting relationship therewith to define a narrow labyrinth or pathway therebetween which at its outer end communicates with the surrounding environment, and at its inner end communicates with the bearing sump. The labyrinth is formed by a series of cooperating steps defined on the rotor and housing, which steps are of maximum diameter at the inner end of the labyrinth and are of decreasing diameter as the labyrinth projects outwardly toward its outer end. The labyrinth allows the stator to be axially moved in one direction toward the rotor so as to axially fit thereover. The stator carries a one-piece snap ring of an elastic material, such as nylon, which cammingly engages and is stretch radially outwardly as the stator initially axially passes over the rotor. When the stator is properly axially positioned in surrounding relationship to the stator, the snap ring resiliently snaps into a shallow annular groove which surrounds the rotor to axially lock the stator and rotor together. This groove has a base diameter which slightly exceeds the normal unstressed inner diameter of the snap ring to create a compression fit therewith, whereby the snap ring is hence fixedly secured to the rotor for rotation therewith. The snap ring projects outwardly of the rotor into a radially enlarged annular collecting chamber formed in the stator, which chamber at its lowermost point communicates with a drain which opens outwardly through the stator. If a contaminate such as water passes inwardly of the labyrinth from the outer end thereof, such will contact the snap ring which, due to its rotation, functions as a slinger so as to cause the contaminate to be thrown outwardly into the bottom of the annular collecting chamber for discharge through the drain. Conversely, any oil which enters into the labyrinth from the inner end must progressively pass through steps of decreasing diameter so that the centrifugal effect of the rotor hence always effectively pumps the oil back toward the sump.

Figure 1:
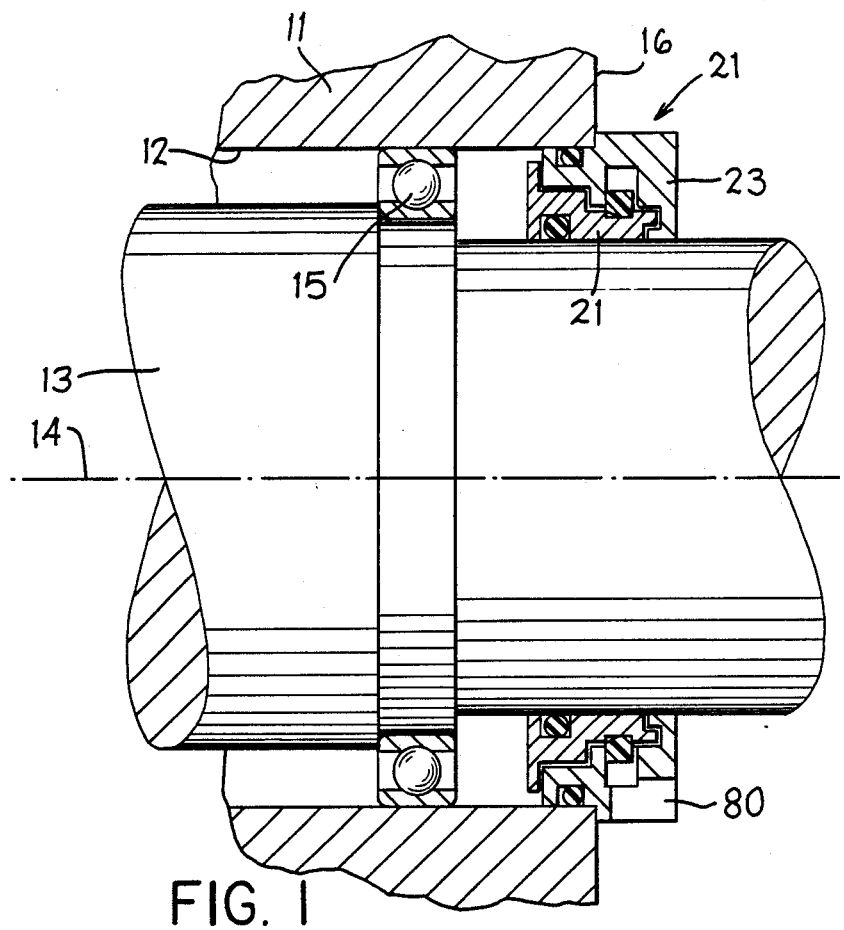
FIG. 1 is a fragmentary, enlarged sectional view showing the bearing protector of the invention cooperating between the bearing housing and shaft.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the overall apparatus and designated parts thereof. Said terminology will include the words specifically mentioned, derivatives thereof, and words of similar import.

DETAILED DESCRIPTION

Referring to FIG. 1, it is illustrated a bearing housing 11 associated with a pump or like device and which defines therein a cylindrical bore or opening 12 which effectively functions as a reservoir or sump for bearing lubricant. A shaft 13, such as a pump shaft, is supported for rotation about its longitudinal axis 14, and for this purpose is supported concentrically within the bore 12 by conventional bearings, one of which is shown at 15. The shaft 13 projects outwardly beyond the end or front face 16 of the housing.

Figure 2:
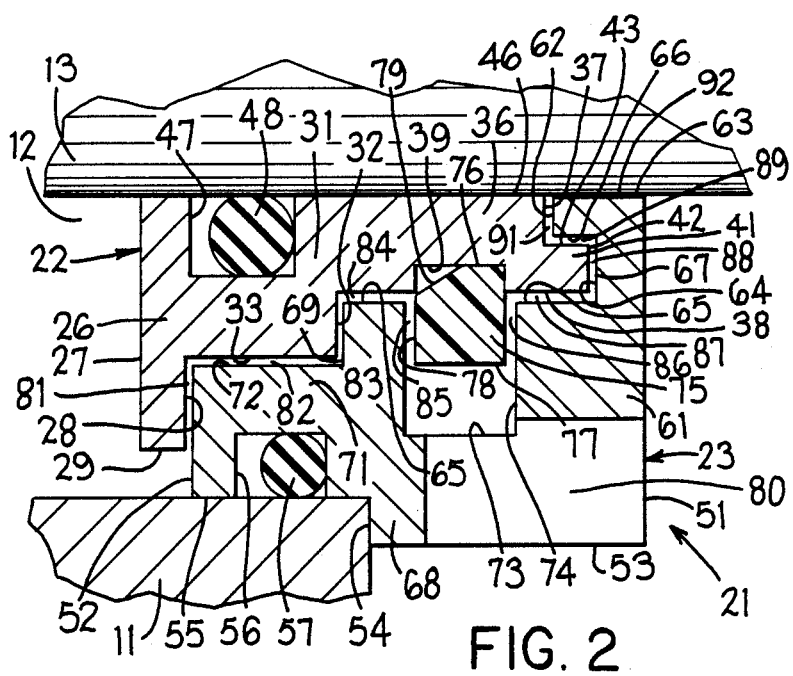
FIG. 2 diagrammatically illustrates, on an enlarged and exaggerated scale, a cross-sectional detail of the bearing protector.

To prevent external contaminates such as water and the like from gaining access to the bearings, and to additionally prevent the bearing lubricant from escaping externally, the present invention provides a sealing device or bearing protector 21 disposed for cooperation between the shaft 13 and housing 11. This bearing protector 21, as illustrated by FIGS. 1 and 2, comprises inner and outer rings which concentrically and relatively rotatably one within the other. More specifically, the bearing protector 21 includes a ringlike rotor 22 which closely surrounds and is both sealingly and nonrotatably coupled to the shaft 13. This rotor 22 in turn is concentrically and closely surrounded by a ringlike stator 23 which is nonrotatably and stationarily secured relative to the surrounding housing 11 The rings 22 and 23 both project at least axially partway into the housing bore 12 substantially as illustrated by FIG. 1. While the rings 22 and 23 closely concentrically surround one another, nevertheless they are slightly spaced apart so as to permit free relative rotation therebetween, and for this purpose the concentric rings define a narrow annular passageway therebetween, the latter involving numerous changes in direction and in effect defining a complex path or labyrinth which effectively prevents the lubricant from passing outwardly therethrough, and at the same time effectively prevents external contaminates from passing inwardly therethrough, as explained in greater detail hereinafter. embodiment of FIGS. 1-2, is of a generally three-step configuration, with the three steps being of progressively decreasing diameter as the rotor 22 projects axially outwardly (rightwardly in FIGS. 1 and 2) toward the surrounding environment.

More specifically, and referring to FIG. 2, the rotor 22 includes an inner annular portion or step part 26 which defines the maximum diameter of the rotor as defined by the surrounding exterior annular wall 29, the latter being significantly smaller than the diameter of bore 12. This inner annular portion 26 defines the inner axial end face 27 of the rotor, and on the other axial side thereof defines an axially outwardly facing surface or shoulder 28. This inner annular portion 26 in turn is integrally joined to an intermediate annular portion or step part 31 which projects axially outwardly away from the surface 28 and has an outer diameter defined by a surrounding annular surface 33 which is of a diameter less than the diameter of surface 29. This intermediate step portion 31 in turn terminates at an axially outwardly facing end surface or shoulder 32.

Rotor 22 also includes an outer annular portion or step part 36 which is integrally joined to and projects axially outwardly from the intermediate portion 31. This outer portion 36 projects axially outwardly from the surface 32 and has an outer diameter as defined by the surrounding annular surface 38 which is substantially smaller than the diameter defined by surface 33. This annular portion 36 projects axially outwardly so as to terminate in an axially outwardly facing annular end surface 37. This outer annular portion 36 also has an annular nose part 41 which projects axially outwardly beyond the end surface 37 so as to terminate in an annular end surface 42, this nose part 41 having an outer diameter which effectively constitutes an extension of the outer annular surface 38. The annular nose part 41, however, has a radially extent which is substantially less than that of the outer portion 36 and hence has an inner annular surface 43. This outer annular portion 36 also has a shallow annular groove 39 formed radially inwardly from the outer surface 38 in surrounding relationship thereto, the purpose of this groove being explained hereinafter.

The rotor 22 also has a cylindrical opening or bore of substantially uniform diameter extending axially therethrough, which bore defines the inner annular wall 46. The diameter of this wall 46 is close to but generally slightly larger than the exterior diameter of the shaft 13. An annular channellike groove 47 projects radially outwardly from this wall 46 for accommodating therein a conventional elastomeric O-ring 48. This O-ring 48 creates a sealed relationship between the shaft 13 and rotor 22, and in addition results in the rotor being nonrotatably coupled to the shaft.

The stator 23, like the rotor 22, is also of a stepped configuration and in the illustrated embodiment includes three steps which are of progressively decreasing inner diameter as the stator projects axially outwardly. This stator 23 extends between outer and inner axial end faces 51 and 52, respectively, and has a maximum outer diameter as defined by a surrounding annular surface 53 which projects axially inwardly from the end face 51. This outer surface 53 is of a larger diameter than the bore 12 so as to hence terminate at an axially inwardly facing surface or shoulder 54 adapted to abut the front face 16 of the housing. The stator has an additional exterior annular surface 55 which is of smaller diameter and which then projects axially inwardly from the shoulder 54 so as to terminate at the inner end face 52. The diameter of this outer surface 55 is close to but generally slightly smaller than the diameter of bore 12. An annular groove 56 is formed in the stator and projects radially inwardly from the surface 55 and accommodates therein an conventional elastomeric O-ring 57 so as to create a sealed and nonrotatable relationship between the stator 23 and the housing 11.

The stator 23, at its outer end, is defined by an outer annular portion or step part 61 which defines the minimum inner diameter of the stator, as defined by the inner annular surface 63, the latter being substantially equal to the diameter of the rotor inner surface 46. This outer step part 61 extends from the end face 51 axially inwardly so as to terminate at an inner annular end face 62, and this portion 61 includes an annular undercut channellike groove 64 which projects axially forwardly from the inner surface 62 through a limited extent so as to terminate in a bottom surface 67 which is spaced rearwardly from the front face 51. This channellike groove 64 is defined between concentric outer and inner annular surfaces 65 and 66 respectively, the latter surface 66 being spaced radially outwardly from the inner annular surface 63. This undercut channellike groove 64 accommodates therein the outwardly projecting nose part 41 of the rotor.

Stator 23 also includes an intermediate annular portion or step part 68 which is integral with and projects axially inwardly from the outer step part 61. This intermediate annular portion 68 has an inner annular surface which effectively constitutes an extension of the annular surface 65 and is hence of significantly greater diameter than the surface 63. The diameter of surface 65 and its axial extent is such that the intermediate annular portion 68 closely concentrically surrounds the outer annular portion 36 of the rotor.

The intermediate annular portion 68 terminates at a radially inwardly extending annular end surface or shoulder 69, at which point the intermediate annular portion 68 is integrally joined to an inner annular portion or step part 71. The latter extends from the surface 69 axially inwardly so as to terminate at the inner end face 52, and defines an inner diameter defined by an inner annular surface 72 which is of greater diameter than the surface 65. The diameter of this surface 72 only slightly exceeds the diameter of the rotor surface 33 so that the inner annular portion 71 of the stator hence closely and concentrically surrounds the intermediate annular portion 31 of the rotor. When so positioned, the inner axial face 52 of the rotor is positioned closely adjacent and substantially directly opposite the shoulder 28 formed on the rotor.

The stator 23 also has a channellike chamber 73 formed therein, which chamber 73 is formed primarily within the intermediate annular portion 68 and opens radially outwardly from the inner annular surface 65 in encircling relationship thereto. This chamber 73 is defined generally between spaced and substantially parallel sidewalls 74 which are spaced a substantial distance apart, and the chamber 73 is of substantial radial depth so as to provide the chamber with substantial volumetric capacity. This chamber 73, at its lowermost portion, communicates with a drain opening 80 which is formed in and extends radially outwardly through the bottom portion of the stator. The annular chamber 73, when the rotor and the stator are assembled in concentric relationship to one another, is disposed generally so as to concentrically surround the shallow annular groove 39 formed in the rotor.

The rotor and stator are axially secured together by a snap ring 75. This snap ring 75 is formed as a one-piece non-split ring constructed of a plastics (more specifically, nylon) material which is relatively hard and rigid but which has sufficient elasticity so as to permit the ring to be elastically expanded a limited radial extent, as explained below.

More specifically, this snap ring 75 is of a generally rectangular configuration and is defined by concentric inner and outer annular surfaces 76 and 77, respectively, which surfaces extend between generally parallel side surfaces 78. The width of ring 75 as defined between the side surfaces 78 closely approximates and is only slightly smaller than the width of channel 73 as defined between side surfaces 74. The outer diameter 77 of the snap ring is substantially smaller than the outer diameter of compartment 73, but is also substantially greater than the diameter of inner surface 65. On the other hand, the inner diameter 76 of the snap ring is substantially smaller than the diameter of surface 65 so that the snap ring thus projects radially inwardly therefrom. In fact, when in a nonelastically distorted condition, the inner diameter 76 of the snap ring is slightly smaller than the inner diameter of the groove 39 defined on the rotor.

The snap ring 75 also has the axially and radially inner corner thereof removed so as to define a tapered surface or cam 79 which extends around the snap ring. This tapered surface 79 slopes radially outwardly from the inner diameter 76 and axially toward the inner axial end 78 so that the inner axial end face 78, at its point of merger with the sloped surface 79, hence has a diameter which exceeds the diameter of rotor surface 38 when the snap ring 75 is in a nondistorted condition.

The snap ring 75 facilitates assembly and subsequent axial retention of the rotor 22 and stator 23 to one another. For example, in view of the reversely stepped configurations of the stator and rotor, they can be easily axially telescoped together into the position illustrated by FIG. 2. During this axial telescoping movement of the stator and rotor toward one another, the snap ring 75 is carried within the compartment 73 and the tapered surface 79 thereof initially engages the outer corner of the nose part 41. Continued inward relative axial movement between the stator and rotor causes the snap ring 75 to be elastically radially outwardly deformed so that the snap ring then axially slides inwardly along the rotor surface 38. Upon reaching the groove 39, the snap ring 75 elastically snaps into the groove 39 to thus axially secure the stator and rotor together. However, since the base of groove 39 has a diameter which is greater than the inner diameter 76 of the snap ring, the engagement of the non-distorted snap ring within the groove 39 results in the snap ring 75 remaining in a radially outwardly elastically deformed condition so that the snap ring inner diameter 76 thus securely grippingly engages the bottom of groove 39, thereby nonrotatably securing the snap ring 75 to the rotor 22. The snap ring 75 hence has a compressive engagement with the rotor equivalent to a shrink or interference fit.

In a typical embodiment of the invention, such as for an arrangement employing a shaft of approximately two-inch diameter, the groove 39 will have a minimum diameter which is approximately 0.060 inch less than the rotor diameter 38, and the snap ring 75 will have an inner diameter 76 which is approximately 0.010 inch less than the minimum diameter of groove 39 when the snap ring is in a nonelastically deformed condition.

The rotor 22 and stator 23 are also each formed as a continuous one-piece ring free of splits.

The concentric interfitting relationship between the rotor 22 and stator 23 results in an annular pathway therebetween, which pathway at its outer end communicates with the surrounding environment, and at its inner end communicates with the sump or bore 12 in the vicinity of the bearing. This pathway includes, at its inner end, a passage 81 which communicates with the sump and projects radially inwardly toward the shaft for communication with a passage 82 which extends axially outwardly, the latter in turn communicating with a further passage 83 which projects radially inwardly toward the shaft, and it in turn communicates with a further passage 84 which projects axially outwardly toward the snap ring 75. Passage 84 then communicates with a narrow passage 85 which projects radially outwardly past the snap ring for communication with the compartment 73. The presence of passage 85 is not essential and, in fact, in the preferred embodiment the snap ring may substantially create a relatively rotatable sliding engagement with the opposed face on the stator.

The pathway between the stator and rotor further includes passage 86 which communicates with the compartment 73 and projects radially inwardly along the other side of the snap ring for communication with a passage 87 which projects axially outwardly for communication with a passage 88 which then projects radially inwardly and communicates with another passage 89 which reversely flows axially inwardly. Passage 89 then communicates with a passage 91 which projects radially inwardly for communication with a passage 92 which projects axially outwardly along the surface of the shaft for communication with the surrounding environment. For efficient and effective operation, all of these passages are preferably maintained of minimum width, which width is preferably and typically in the neighborhood of about 0.005 inch.

Figure 3:
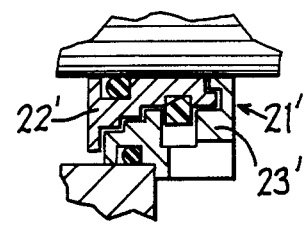
FIG. 3 illustrates a variation.

FIG. 3 illustrates a variation of the sealing device. More specifically the sealing device 21' of FIG. 3 identically corresponds to the sealing device 21 of FIGS. 1 and 2 except that the axially inner end of the pathway between the stator 23' and rotor 22' is provided with three steps rather than two steps as in the FIGS. 1 and 2 embodiment. The provision of this third step still further increases the effectiveness of the sealing device in preventing outward escape of lubricant.

OPERATION

The operation of the invention will be briefly described to ensure a complete understanding thereof.

During rotation of shaft 13 relative to housing 11, the lubricant associated with the bearing and/or the fluids within the interior compartment or bore 12 will be churned due to the rotation, and such fluids will attempt to escape through the sealing device 21. However, if the fluid moves into the passage 81 and thence into the subsequent passages 82, 83 and 84, the natural tendency of the sealing device 21 is to not only restrict the passage of such fluid in view of the narrowness of the passages and the corners associated therewith, but more significantly the effect of the sealing device 21 is to create a pumping action which returns the fluid to the compartment 12. That is, due to the rotation of the rotor 22 and of the surfaces thereon which bound the passages 81 and 83, any fluid in the passages 81 and 83 is acted on by the centrifugal effect of the rotor and hence there is a natural tendency for fluids within passages 81 and 83 to be pump radially outwardly so that the fluid is ultimately returned to the housing compartment or bore 12.

On the other hand, with respect to any fluids such as water or other contaminates which tend to move through the sealing device from the surrounding environment, any such contaminates must first flow through passage 92 and 91 into passage 89, thus undergoing a first flow reversal which itself tends to impede inflow of contaminates. From the passage 89 the contaminates must then flow through passage 88 into passage 87 which hence undergoes another flow reversal which still further impedes the inward flow of contaminates. If contaminates do reach the passage 87, then their contact with the rotating snap ring 75 causes the latter to effectively act as a slinger ring in that the contaminates are thrown outwardly through the passage 86 to the outer diameter of the compartment 73. The contaminates within this compartment 73 flow downwardly to the lowermost extremity thereof, at which point the contaminates are discharged back to the environment through the drain port 80.

With the arrangement of the present invention, the snap ring 75 thus not only facilitates the construction and assembly of the sealing device, but it also operationally functions as a slinger ring so that external contaminates are thrown outwardly of the compartment 73 so as to be supplied to the exterior drain.

In addition to the dynamic operation as described above, the seal device 71 is also highly effective for preventing flow of fluid therethrough under a static condition. For example, under a static condition (that is, the shaft being stationary), the lubricant within chamber 12 tends to collect within the bottom of this chamber, and depending upon the level of the fluid, may tend to flow by gravity outwardly through the passageway between the stator and rotor. To do so, the fluid in the bottom of chamber 12 must first flow upwardly through radial passage 81, then axially along passage 82, and then upwardly through passage 83. Hence, not only does this upwardly stepped arrangement provide a significant dam for preventing outward gravity flow of lubricant, but the upward stepped arrangement itself greatly restricts any such flow due to the narrowness of the passages and the inherent throttle or restricting effect created thereby due to the surface friction with the lubricant.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a shaft rotatable about its longitudinally extending axis, a housing disposed in surrounding relationship to the shaft and defining therein a cylindrical bore which concentrically surrounds the shaft, bearing means coacted between said housing and said shaft for rotatably supporting said shaft, and a bearing protector associated with said cylindrical bore at a location spaced axially outwardly from said bearing means and coacting between said shaft and said housing for sealingly isolating the bearing means from a region which is disposed exteriorly of the bearing protector, said bearing protector including a one-piece ring-shaped rotor sealingly and nonrotatably carried on said shaft and disposed for cooperation with a one-piece ring-shaped stator which is sealingly and nonrotatably mounted on said housing at least partially within said cylindrical bore, said stator being disposed radially in concentric and surrounding relationship to said rotor, said stator and rotor respectively having first and second annular surface means formed thereon and disposed in concentric and closely adjacent relationship to one another so as to define therebetween an elongate annular pathway which extends axially over a significant extent and at its inner end communicates with a bearing compartment and at its outer end communicates with the exterior region, said pathway including an inner passageway which is of very narrow width as defined between opposed portions of said first and second annular surface means for inhibiting flow therethrough, said inner passageway having a length which exceeds its width and defining the inner end of said pathway for direct communication with the bearing compartment, said pathway including an outer passageway which is of very narrow width as defined between opposed portions of said first and second annular surface means for inhibiting flow therethrough, said outer passageway having a length which exceeds its width and defining the outer end of said pathway for direct communication with the exterior region, the improvement comprising:

said stator having a channellike collecting chamber formed therein, said collecting chamber being disposed in communication with said pathway substantially at the inner ends of said inner and outer passageways, said channellike chamber projecting radially outwardly from said first annular surface means in surrounding relationship thereto, said collecting chamber having axial and radial cross-sectional dimensions which are large in relationship to the width of said passageways;

said rotor having a channellike groove formed therein in encircling relationship thereto, said channellike groove projecting radially inwardly from said second annular surface means and being of shallow radial depth, said channellike groove being generally radially aligned with said channellike chamber;

a one-piece slinger ring stationarily seated within said channellike groove and projecting radially outwardly therefrom a substantial radial extent into said channellike chamber, said slinger ring having an axial cross-section which closely approximates the axial cross-section of said channellike chamber so that the slinger ring is axially closely confined within said chamber, said slinger ring being constructed of a relatively hard plastics material having limited elasticity so as to be snap fit into said channellike groove, said slinger ring being sufficiently radially outwardly elastically deformable so as to be slidably displaced axially over a portion of said second annular surface means as disposed directly adjacent said groove during assembly of said stator and rotor.

2. A combination according to claim 1, wherein said inner passageway includes a first passage which extends generally radially and at its radially outer end communicates with said bearing compartment, a second passage which extends axially and at one end communicates with the radial inner end of said first passage, and a third passage which extends generally radially and at its radially outer end communicates with the other axial end of said second passage.

3. A combination according to claim 2, wherein said inner passageway includes at least one additional passage which extends generally axially and at one thereof communicates with the radially inner end of said third passage, said additional passage at the other end thereof being disposed in communication with a region adjacent one axial side of said slinger ring.

4. A combination according to claim 3, wherein said outer passageway includes a first passage which projects radially outwardly and at its radial inner end communicates with the exterior region at a location closely adjacent the periphery of said shaft, said first passage at its outer end communicating with a second passage which then projects axially outwardly and at its other end communicates with a third passage which then projects radially outwardly, said third passage at its radially outer end communicating with one end of a fourth passage which then projects axially inwardly for communication with a location adjacent an axially outer side of said slinger ring.

5. A combination according to claim 4, wherein said slinger ring has an opening extending concentrically therethrough and surrounded by an annular cylindrical surface which projects inwardly from one axial side of the slinger ring, said annular cylindrical surface being disposed in supportive engagement with said rotor, said cylindrical surface extending only axially partway across said slinger ring and merging with a conically tapered surface which projects radially outwardly as it projects axially toward the other side of the slinger ring to define a cam surface which is effective for engagement with the rotor during installation of the stator over the rotor so that the slinger ring can be resiliently radially expanded so as to pass over a part of the rotor and thence resiliently snap into the channellike groove.

6. A bearing protector spaced axially from a bearing means and coacting between a rotatable shaft and a surrounding housing for sealingly isolating the bearing means from a region which is disposed exteriorly of the bearing protector, said bearing protector comprising:

a one-piece ring-shaped rotor adapted to be sealingly and nonrotatably carried on the shaft and disposed for cooperation with a one-piece ring-shaped stator which is adapted to be sealingly and nonrotatably mounted on the housing;

said stator being disposed radially in concentric and surrounding relationship to said rotor, said stator and rotor respectively having first and second annular surface means formed thereon and disposed in concentric and closely adjacent relationship to one another so as to define therebetween an elongate annular pathway which extends axially over a significant extent and at its inner end communicates with a bearing compartment and at its outer end communicates with the exterior region;

said pathway including an inner passageway which is of very narrow width as defined between opposed portions of said first and second annular surface means for inhibiting flow therethrough, said inner passageway having a length which exceeds its width and defining the inner end of said pathway for direct communication with the bearing compartment;

said pathway including an outer passageway which is of very narrow width as defined between opposed portions of said first and second annular surface means for inhibiting flow therethrough, said outer passageway having a length which exceeds its width and defining the outer end of said pathway for direct communication with the exterior region;

said stator having a channellike collecting chamber formed therein, said collecting chamber being disposed in communication with said pathway substantially at the inner ends of said inner and outer passageways, said channellike chamber projecting radially outwardly from said first annular surface means in surrounding relationship thereto;

said rotor having a channellike groove formed therein in encircling relationship thereto, said channellike groove projecting radially inwardly from said second annular surface means, said channellike groove being generally radially aligned with said channellike chamber;

a one-piece slinger ring stationarily seated within said channellike groove and projecting radially outwardly therefrom a substantial radial extent into said channellike chamber, said slinger ring being constructed of a relatively hard plastics material having limited elasticity so as to be snap fit into said channellike groove.

* * * * *